United States Patent [19]

Chow

[11] Patent Number: 5,233,109
[45] Date of Patent: Aug. 3, 1993

[54] PRODUCTION OF SYNTHETIC CRUDE PETROLEUM

[75] Inventor: Peng W. Chow, Singapore, Singapore

[73] Assignee: National University of Singapore, Singapore, Singapore

[21] Appl. No.: 608,929

[22] Filed: Nov. 5, 1990

[30] Foreign Application Priority Data

Nov. 6, 1989 [GB] United Kingdom ............... 8924988
Nov. 16, 1989 [GB] United Kingdom ............... 8925952

[51] Int. Cl.$^5$ ............................................. C07C 1/00
[52] U.S. Cl. .................................. 585/241; 585/240
[58] Field of Search ................................. 585/240, 241

[56] References Cited

U.S. PATENT DOCUMENTS

| | | | |
|---|---|---|---|
| 3,582,279 | 6/1971 | Beckman et al. | 585/241 |
| 3,704,108 | 11/1972 | Alpert | 585/241 |
| 4,300,009 | 11/1981 | Haag et al. | 585/241 |
| 4,652,686 | 3/1987 | Coenen et al. | 585/240 |
| 4,822,935 | 4/1989 | Scott | 585/242 |
| 4,968,405 | 11/1990 | Wachter | 208/120 |

*Primary Examiner*—Patrick P. Garvin
*Assistant Examiner*—E. D. Irzinski
*Attorney, Agent, or Firm*—Lowe, Price, LeBlanc & Becker

[57] ABSTRACT

Synthetic crude petroleum is produced by catalytically cracking a biomass material (P) comprising (a) a plant oil and/or (b) an animal oil and/or (c) a rubber using a catalyst. The catalyst comprises alumina with or without a component (Q) chosen from silica and/or crystalline aluminosilicate zeolites and/or rare earth oxides and/or sodium oxide admixed with alumina. If present, the total amount of said component constitutes a lesser amount by weight of the catalyst mixture.

14 Claims, No Drawings

PRODUCTION OF SYNTHETIC CRUDE PETROLEUM

This invention is concerned with the conversion of plant oils and animal oils, substances such as fatty acids and esters and other substances derived from them and natural and processed rubbers such as vehicle tires and tubes into hydrocarbons and chemicals. More particularly, by the process of this invention, the above named substances are catalytically converted in an energy efficient high yield operation into hydrocarbons that are useful for the production of gasoline, kerosene, diesel and other chemicals. Further, this invention provides a process for producing hydrocarbons from renewable energy sources.

In recent years much work has centered on the use of vegetable seed oils and their derivatives, alone or in admixture with diesel, alcohol or gas oil, as diesel fuel in compression ignition engines. Results showed that such engines could run satisfactorily for short periods of time although prolonged operation with such fuels have revealed many problems ranging from engine wear, incomplete combustion, coking of nozzles and formation of polymeric material in the engine crank case.

There have also been prior attempts to produce synthetic fuels from other sources. Some examples of such fuel production are: recovery of syncrude from shale by in situ extraction with heated air and retorting; extraction of heavy oil from tar sands by heating with water and alkali and subsequent refining of the oil; Lurgi gasification of coal to syn gas; Fischer-Tropsch coal conversion into liquid syncrude; Mobil's gasoline from coal process; and anaerobic digestion of biomass to methane. However, these processes, besides being expensive, suffer from many disadvantages, chief of which are environmental pollution and disposal problems, undesirable low value by-products, and product streams that require multi-steps handling.

While olefins can be manufactured from carboxylic acids and esters by catalytic conversion with nickel catalysts containing tin, germanium or lead, the process is confined mostly to starting materials derived from saturated oils. For the process to be useful, the oils must first be subjected to a process of hydrogenation and then conversion to the acids or esters before the derived materials can be used in the process. Moreover, economic consideration is an important factor because of the many steps involved and the need for further processing before the final products can be used as fuels.

Catalytic conversion of biomass into fuels involving aluminosilicate zeolites have also been reported. However, this method suffers from the disadvantages of low yields, extensive coke formation and rapid poisoning of the catalyst.

As the 21st century and possibly the twilight of the fossil fuel era approaches, the availability of alternative fuel supplies continues to be of major global concern. Increasing cost of petroleum, a major source of fossil energy, is inevitable because of limited availability. As plant oils and animal oils and rubbers are renewable energy sources, the ability to convert them into hydrocarbon fuels in a simple straightforward energy efficient process would certainly add a new dimension in the quest for a solution to the global energy problem.

It has now been discovered that biomass materials such as plant oils and animal oils, including fatty acids, esters and related substances derived from them and natural and processed rubbers such as vehicle tires and tubes, can be converted directly in a simple energy efficient catalytic process to hydrocarbons in high yields.

According to this invention there is provided a process for producing synthetic crude petroleum by catalytically cracking a biomass material (P) comprising (a) a plant oil and/or (b) an animal oil and/or (c) a rubber using a catalyst comprising alumina with or without a component (Q) chosen from silica and/or crystalline aluminosilicate zeolites and/or rare earth oxides and/or sodium oxide admixed with alumina, the total amount of the said component (Q), if present, constituting a lesser amount by weight, preferably no more than 25% by weight, of the catalyst mixture. The catalyst used may be substantially wholly alumina. The process may be carried out in the presence of a carrier gas, preferably a carrier gas comprising air or nitrogen or argon or helium or hydrogen or a hydrocarbon obtained from petroleum refining and cracking operations, e.g. methane.

The biomass material (P) may comprise triglycerides, fatty acids, esters and related substances derived from them. The rubber may be in the form of a vehicle tire or tube.

It is a preferred feature of this invention that the said oils defined by (a) and (b) (which may be triglycerides of fatty acids wherein the fatty acid moiety ranges from 4 to 30 carbon atoms, the fatty acids most commonly being saturated or containing 1, 2 or 3 double bonds) need not be in anhydrous or pure form or be subjected to prior hydrogenation by methods known in the art. The said oils may contain variable amounts of free fatty acids and/or esters both of which may also be converted to hydrocarbons during the process of this invention. As the said oils may be composed not only of natural glycerides but other materials like carotenoids, hydrocarbons, phosphatides, simple fatty acids and their esters, terpenes, sterols, fatty alcohols, tocopherols, polyisoprene, carbohydrates and proteins, for the purpose of this invention the said oils may contain such materials as part of their composition. It should be noted that in the case of the plant oils the preferred oils are palm oil, coconut oil, corn oil, soya oil, safflower oil, sunflower oil, linseed oil, olive oil and peanut oil. In the case of animal oils, the preferred oils are pork lard, beef fat, mutton fat and chicken fat. It is to be understood that for the purpose of this invention, mixtures of the oils, although of different origins, are suitable as feed to the catalytic conversion step. Thus mixtures of the plant oils, mixtures of the animal oils, and mixtures which include plant oils and animal oils are within the scope of this invention. Natural fatty acids and esters, other than triglycerides, also may be used in the process of this invention. Palm fatty acids and methyl esters derived from transesterification of plant oils and animal oils, the residue and light ends fractions obtained during acid splitting of palm oil may be used. In the case of the said rubbers, the preferred rubbers are natural rubbers and processed rubbers such as vehicle tires and tubes.

The catalyst useful in this invention comprises alumina with or without said component (Q) as hereinbefore defined. For the purpose of this invention the preferred catalysts are Fluka Type 504C Alumina (pH 4.5), Fluka Type 507C Alumina (pH 7), Fluka Type 5016A Alumina (pH 9.5), Merck Silica Gel 100 (70-230 mesh), Union Carbide Zeolite X and Akzo Ketjen Catalysts KMC-23 and Vision-47-3A. Contacting the said oil or rubber or mixture thereof with the catalyst in the process of this invention may be carried out with the catalyst as a fixed bed reactor. Considered as within the scope of this invention, the catalyst can be used as a moving bed reactor, operated in a transport fashion such that the catalyst is cycled between a reaction zone and a regeneration zone, as is currently the practice in the petrochemical industry. It is to be noted that the contacting step can be conducted directly or in an atmosphere containing a gaseous substance such as air or nitrogen or argon or helium or hydrogen or other hydrocarbons obtained from petroleum refining and cracking operations, for example methane; a preferred flow rate of the gas is from 30 ml/min to 1900 ml/min, a more preferred flow rate being 90 ml/min to 300 ml/min. After the contacting step the catalyst may be regenerated by heating in a stream of oxygen enriched air at a temperature from 550° C. to 750° C. During the process of this invention, the pressure applied is preferably about 1 atmosphere to 10 atmospheres. A pressure of about one atmosphere will usually be satisfactory. The reaction temperature of the catalyst is preferably in a range from 300° C. to 680° C., a more preferred reaction temperature being in a range from 420° C. to 550° C. A preferred ratio of the catalyst weight to the oil or rubber weight is in a range from 1:1 to 10:1. For a fixed bed reactor, a more preferred value for every 2 to 6 parts by weight of the catalyst, one part by weight of the oil or rubber is fed per hour to the catalyst. Under the conditions of the catalytic reaction given above, gaseous and liquid hydrocarbons, coke, water and hydrogen sulphide may be formed. When rubber is used as feed stock, in addition to the products mentioned above, ammonia may also be formed. As described herein above, the hydrocarbons produced may be fractionally distilled to fractions suitable for the production of gasoline, kerosene, diesel and other chemicals.

This invention will be illustrated by the following examples. They are given only to illustrate this invention and are not intended to limit the scope of the present invention.

EXAMPLE 1

In this example, the results of which are shown in Tables 1 and 2, 160 g of crude palm oil (free fatty acid content 3.5%), heated to a temperature of 120° C., was passed at a steady rate during 4 hr. over a fixed bed of 112 g Fluka Type 504C alumina (pH 4.5) maintained at 510° C. and one atmosphere pressure with nitrogen gas flowing at 120 ml per minute. The products were collected in three traps connected in series and cooled respectively in air, cold water and acetone-dry ice. The products in the traps were combined and after separation from the water, the oil was found to comprise hydrocarbons with no uncracked starting material.

EXAMPLE 2

In this example, the cracking of 160 g of palm fatty acids was performed with argon as the reagent gas under the same conditions as stated in Example 1. After separation from the water, the oil was found to comprise hydrocarbons without any uncracked starting material. The results are shown in Table 3.

EXAMPLE 3

In this example the cracking of 160 g of a mixture consisting of equal proportions of palm oil, coconut oil, corn oil, soya oil, safflower oil, sunflower oil, linseed oil, olive oil, peanut oil, palm fatty acids, pork lard, beef fat, mutton fat and chicken fat was performed as described in Example 1. After separation from the water, the oil was found to comprise hydrocarbons without any uncracked starting material. The results are shown in Table 3.

EXAMPLE 4

In this example, the cracking of 160 g of palm oil (free fatty acid content 3.5%) was performed with argon as the reagent gas and a catalyst mixture containing 100.8 g Fluka Type 504C Alumina (pH 4.5) and 11.2 g Akzo Ketjen Vison-47-3A as described in Example 1. After separation from the water, the oil was found to comprise hydrocarbons without any uncracked starting material. The results are shown in Table 3.

EXAMPLE 5

In this example, the cracking of 160 g of sunflower oil was performed with argon as the reagent gas and a catalyst mixture containing 100.8 g Fluka Type 504C alumina (pH 4.5) and 11.2 g Union Carbide Zeolite X as described in Example 1. After separation from the water, the oil was found to comprise hydrocarbons without any uncracked starting material. The results are shown in Table 3.

EXAMPLE 6

In this example, the cracking of 160 g of palm oil (free fatty acid content 3.5%) was performed with nitrogen as the reagent gas and a catalyst mixture containing 100.8 g Fluka Type 504C Alumina (pH 4.5) and 11.2 g Merck Silica Gel 100 (70–230 mesh) as described in Example 1. After separation from the water, the oil was found to comprise hydrocarbons without any uncracked starting material. The results are shown in Table 3.

EXAMPLE 7

In this example, 160 g of crude palm oil (free fatty acid content 3.5%) heated to a temperature of 120° C. was passed at a steady rate during 4 hr. over a fixed bed of 112 g Fluka Type 504C Alumina (pH 4.5) maintained at 510°. The products were collected as described in Example 1. After separation from the water, the oil was found to comprise hydrocarbons. The results are shown in Table 3.

EXAMPLE 8

In this example, the results of which are shown in Table 3, 49 g of molten commercial hevea rubber (obtained previously by coagulating the rubber latex with formic acid, pressed between rollers to remove the liquid, then air dried and smoked) was passed at a steady rate during 1 hr. over a fixed bed of 112 g Fluka Type 504C Alumina (pH 4.5) maintained at 510° C. and one atmosphere pressure with argon as reagent gas as described in Example 1. After separation from the water, the oil was found to comprise hydrocarbons.

EXAMPLE 9

In this example, the results of which are shown in Table 3, 40 g of a used car rubber tube was placed in a glass tube and the temperature quickly raised to 510° C. within about 20 minutes with argon flowing at 120 ml per minute. The molten rubber was then passed over a fixed bed of 78 g of Fluka Type 504C Alumina (pH 4.5) maintained at 510° C. and one atmosphere pressure during 35 minutes. After separation from the water, the oil was found to comprise hydrocarbons.

The various named catalysts like Fluka Alumina, Merck Silica Gel, Akzo Ketjen KMC-23, Akzo Ketjen Vision-47-3A, Union Carbide Zeolite X are commercially available materials.

| | |
|---|---|
| Fluka Alumina | $Al_2O_3$ |
| Merck Silica Gel | $SiO_2$ |
| Akzo Ketjen KMC-23 | $Al_2O_3$, $Na_2O$, $SiO_2$, rare earth oxides |
| Akzo Ketjen Vision-47-3A | |
| Union Carbide Zeolite X | $Al_2O_3$, $SiO_2$, $Na_2O$ |

TABLE 1

YIELD OF LIQUID HYDROCARBONS FROM CRACKING OF OILS

| Oil | PO | CNO | CO | SO | SAO | SNO | LO | OO | PNO |
|---|---|---|---|---|---|---|---|---|---|
| Yield of Liquid Hydrocarbon (Weight Percent) | 71 | 62.5 | 68 | 58 | 64 | 58 | 57 | 69 | 64.5 |

| Oil | PL | BF | MF | CF | PFA | PFAME | MFME | RES | LE |
|---|---|---|---|---|---|---|---|---|---|
| Yield of Liquid Hydrocarbon (Weight Percent) | 68 | 65 | 67 | 67.5 | 71.5 | 70 | 73.5 | 73 | 67.5 |

Catalyst: Fluka Type 504C Alumina (pH 4.5)
Carrier Gas/Flow Rate: Nitrogen Gas/120 ml per min
Reaction Temperature: 510° C.
Reaction Pressure: 1 Atmosphere
In all cases there was no uncracked starting material in the hydrocarbon products
i.e. representing 100% conversion.

PO — Palm Oil       PL — Pork Lard
CNO — Coconut Oil   BF — Beef Fat
CO — Corn Oil       MF — Mutton Fat
SO — Soya Oil       CF — Chicken Fat
SAO — Safflower Oil PFA — Palm Fatty Acids
SNO — Sunflower Oil PFAME — Palm Fatty Acid Methyl Esters
LO — Linseed Oil    MFME — Mutton Fat Methyl Esters
OO — Olive Oil      RES — Residue fraction from acid splitting of palm oil
PNO — Peanut Oil    LE — Light ends fraction from acid splitting of palm oil

TABLE 2

DISTILLATION CHARACTERISTICS OF CRUDE PETROLEUM SAMPLES AND LIQUID HYDROCARBONS OBTAINED FROM THE CRACKING OF OILS AS SHOWN IN TABLE 1

| Boiling Point °C. | Sample PERCENTAGE DISTILLATE OBTAINED (VOLUME PERCENT) | | | | | | | | | | | | |
|---|---|---|---|---|---|---|---|---|---|---|---|---|---|
| | PO | CNO | CO | SO | SAO | SNO | LO | OO | PNO | PL | BF | MF | CF |
| 150 | 12.6 | 5 | 8.5 | 6 | 18.5 | 17.5 | 13 | 17 | 11.5 | 14.5 | 10 | 9 | 9 |
| 200 | 22 | 25 | 22 | 19.5 | 30 | 29.5 | 25.5 | 31 | 26.5 | 26.5 | 23 | 20 | 20.5 |
| 250 | 40 | 47.5 | 39 | 43 | 46.5 | 46 | 41 | 45 | 42 | 41 | 37 | 34.5 | 35 |
| 300 | 70 | 73 | 64 | 65.5 | 69 | 70 | 66.5 | 71 | 69 | 62.5 | 60.5 | 61 | 61 |

| Boiling Point °C. | Sample PERCENTAGE DISTILLATE OBTAINED (VOLUME PERCENT) | | | | | | | |
|---|---|---|---|---|---|---|---|---|
| | PFA | PFAME | MFME | RES | LE | Tapis Crude | Shengli Crude | Arab Light Crude |
| 150 | 10 | 12.5 | 14.5 | 5 | 7 | 8 | 6 | 16 |
| 200 | 20 | 26 | 28.5 | 11 | 19.5 | 17 | 11.5 | 27 |
| 250 | 37 | 43.5 | 45.5 | 20 | 35.5 | 26.5 | 16.5 | 36.5 |
| 300 | 66 | 66.5 | 71 | 59 | 57 | 40 | 25 | 49 |

TABLE 3

YIELD AND DISTILLATION CHARACTERISTICS OF LIQUID HYDROCARBONS OBTAINED FROM THE CRACKING OF OILS AND RUBBERS UNDER DIFFERENT CONDITIONS

| CATALYST | Alumina (pH 4.5) | | | | | | | | | | | | | |
|---|---|---|---|---|---|---|---|---|---|---|---|---|---|---|
| OIL/RUBBER | PFA | PFA | PO | PO | PO | PO | PO | PO | PO | MP | MA | MPA | NR | CTRT |
| Carrier Gas Flow Rate 120 ml/min | $H_2$ | Ar | $N_2$ | Ar | He | $H_2$ | $CH_4$ | Air | No gas | $N_2$ | $N_2$ | $N_2$ | Ar | Ar |
| Reaction Temperature | 510 | 510 | 550 | 510 | 510 | 510 | 510 | 510 | 510 | 510 | 510 | 510 | 510 | 510 |
| Yield of Liquid Hydrocarbons (weight percent) | 63.5 | 67 | 70 | 69 | 67 | 66 | 36 | 57.5 | 64 | 61.5 | 64 | 64 | 66 | 51 |
| DISTILLATION OF HYDROCARBON PRODUCTS | | | | | | | | | | | | | | |

TABLE 3-continued
YIELD AND DISTILLATION CHARACTERISTICS OF LIQUID HYDROCARBONS OBTAINED FROM THE CRACKING OF OILS AND RUBBERS UNDER DIFFERENT CONDITIONS

| Distillation Temperature °C. | | | | | | | | | | | | | | |
|---|---|---|---|---|---|---|---|---|---|---|---|---|---|---|
| 150 | 16 | 11 | 15.5 | 12 | 8.5 | 13.5 | 11.5 | 13 | 28 | 17.5 | 9 | 15.5 | 24 | 10 |
| 200 | 29 | 22.5 | 29.5 | 22 | 18 | 28.5 | 20.5 | 25 | 45 | 34 | 26 | 30 | 62.5 | 36.5 |
| 250 | 48 | 40.5 | 52 | 38.5 | 34 | 46.5 | 36.5 | 42 | 65.5 | 50 | 41 | 45.5 | 76.5 | 48.5 |
| 300 | 72 | 69 | 78 | 65 | 59 | 69.5 | 60 | 68 | 84 | 69 | 64 | 65 | 87.5 | 69.5 |

| CATALYST | Alumina (pH 7) | Alumina (pH 9.5) | Alumina (pH 4.5) + 10% Vision | Alumina (pH 4.5) + 10 KMC | Alumina (pH 4.5) + 10% Zeolite X | Alumina (pH 4.5) + 10% Merck Silica Gel 100 |
|---|---|---|---|---|---|---|
| OIL/RUBBER | PFA PFA PFA | | PO | CNO | SNO | PO |
| Carrier Gas Flow Rate 120 ml/min | He Ar Ar | | Ar | Ar | Ar | N₂ |
| Reaction Temperature | 510 510 510 | | 510 | 510 | 510 | 510 |
| Yield of Liquid Hydrocarbons (weight percent) | 52 61 62 | | 57.5 | 58 | 61 | 57.5 |

DISTILLATION OF HYDROCARBON PRODUCTS

| Distillation Temperature °C. | | | | | | | |
|---|---|---|---|---|---|---|---|
| 150 | 11 | 11 | 11 | 23 | 22 | 19 | 18 |
| 200 | 21 | 22 | 22.5 | 38.5 | 45.5 | 34 | 33.5 |
| 250 | 37.5 | 36.5 | 40.5 | 57.5 | 65 | 46.5 | 53 |
| 300 | 68.5 | 68 | 69 | 79 | 77.5 | 65 | 76 |

All the above conversions were performed at 1 atmosphere pressure.
In all cases there was no uncracked starting material in the hydrocarbon products
PFA — Palm Fatty Acids
PO — Palm Oil
MP — Mixture of palm oil, coconut oil, soya oil, safflower oil, sunflower oil, linseed oil, olive oil, peanut oil and palm fatty acids
MA — Mixture of pork lard beef fat, mutton fat and chicken fat
MPA — Mixture of MP and MA
CNO — Coconut Oil
SNO — Sunflower Oil
NR — Commercial hevea rubber
CTRT — Car type rubber tube

What is claimed is:

1. A process for producing liquid synthetic crude petroleum by catalytically cracking a biomass material which comprises contacting a substance selected from the group consisting of (a) a plant oil, (b) an animal oil, and (c) a rubber, with a catalyst selected from the group consisting of (i) essentially alumina or (ii) alumina combined with a component (Q) selected from the group consisting of silica, rare earth metal oxides and sodium oxide admixed with alumina, and when present, the total amount of the said component (Q) constituting a lesser amount by weight of the catalyst mixture than the alumina.

2. A process as claimed in claim 1, wherein the component (Q) comprises no more than 25% by weight of the catalyst mixture.

3. A process as claimed in claim 1, wherein the catalyst consists essentially of alumina.

4. A process as claimed in claim 1, which is carried out in the presence of a carrier gas.

5. A process as claimed in claim 4, wherein the carrier gas is selected from the group consisting of air, nitrogen, argon, helium, hydrogen and a hydrocarbon which has been obtained from petroleum refining and cracking operations.

6. A process as claimed in claim 5, wherein the said hydrocarbon carrier gas is methane.

7. A process as claimed in claim 1, wherein the biomass material (P) comprises triglycerides, fatty acids, esters and related substances derived from them.

8. A process as claimed in claim 1, wherein the rubber (c) is natural rubber or in the form of a vehicle tire or tube.

9. A process as claimed in claim 1, wherein the said oils defined by (a) and (b) are selected from the group consisting of oils which are not in anhydrous or pure form and which have not been subjected to prior hydrogenation by methods known in the art.

10. A process as claimed in claim 1, wherein the said oils defined by (a) and (b) are triglycerides of fatty acids wherein the fatty acid moiety ranges from 4 to 30 carbon atoms.

11. A process as claimed in claim 10, wherein the said fatty acids are selected from the group consisting of saturated fatty acids and fatty acids containing 1 to 3 double bonds.

12. A process as claimed in claim 1, wherein the temperature of the catalyst is in a range of 300° C. to 680° C.

13. A process as claimed in claim 12, wherein the temperature of the catalyst is in a range of 420° C. to 550° C.

14. A process according to claim 1, wherein the reaction is conducted at a reaction temperature of 420° C. to 550° C., a pressure of 1 to 10 atmospheres, a ratio of catalyst weight to oil or rubber of 1:1 to 10:1, and in the presence of a carrier gas.

* * * * *